May 28, 1946.    C. D. MILLER    2,400,885
HIGH-SPEED CAMERA
Filed June 12, 1940    3 Sheets-Sheet 1

INVENTOR
CEARCY D. MILLER
BY
W. Glenn Jones
ATTORNEY

May 28, 1946.                C. D. MILLER                 2,400,885
                           HIGH-SPEED CAMERA
                        Filed June 12, 1940           3 Sheets-Sheet 2
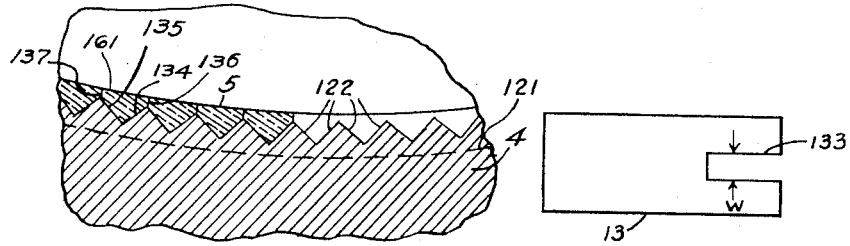
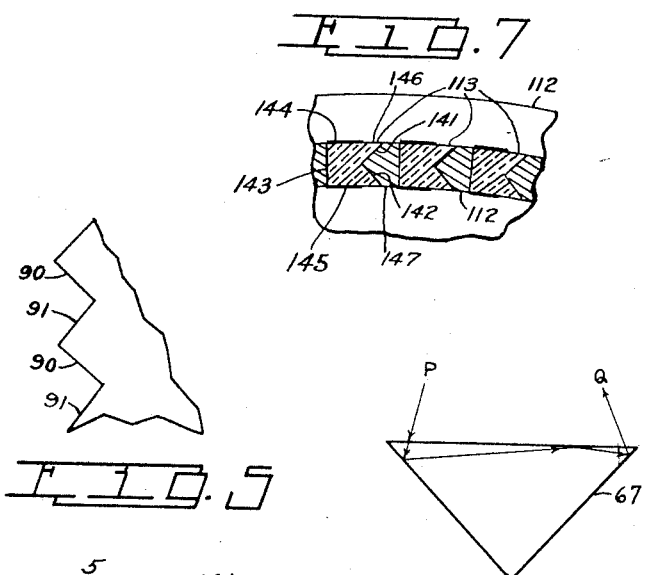
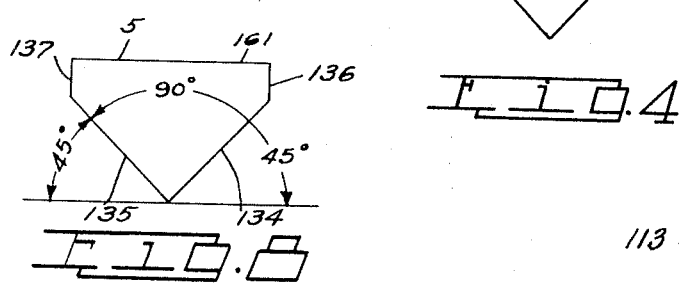
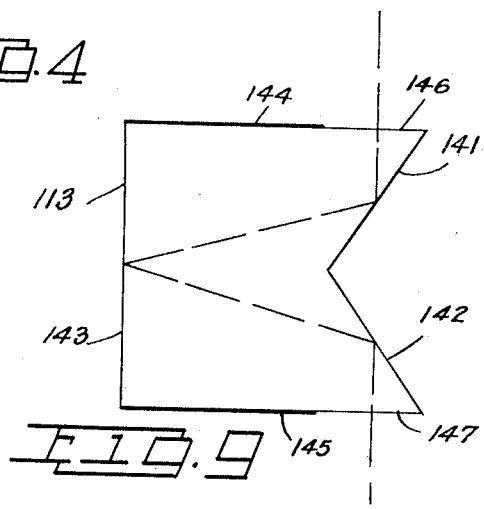
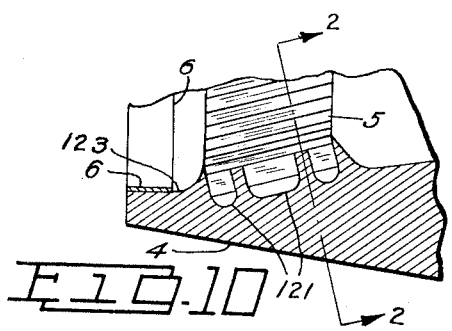
INVENTOR
CEARCY D. MILLER
BY
ATTORNEY

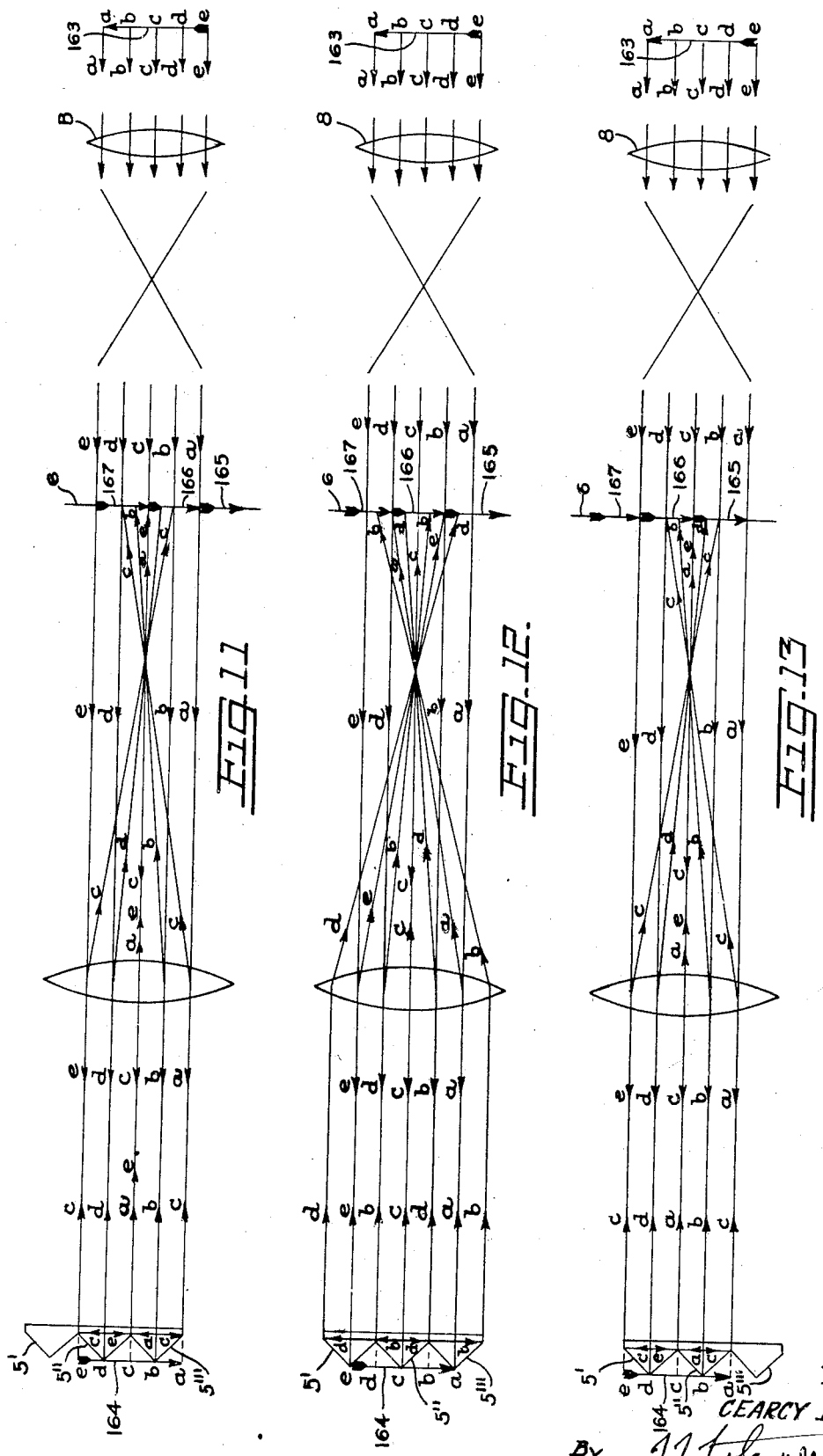

Patented May 28, 1946

2,400,885

UNITED STATES PATENT OFFICE 2,400,885

HIGH-SPEED CAMERA

Cearcy D. Miller, Hampton, Va.

Application June 12, 1940, Serial No. 340,068

14 Claims. (Cl. 88—16.8)

(Granted under the act of March 3, 1883, as amended April 30, 1928; 370 O. G. 757)

This invention relates to a device which is capable of taking photographs of widely varying phenomena at very high rates. Photographs at rates up to 40,000 per second have already been attained with one form of the device and much higher speeds are possible with modified forms. The device is adaptable to the taking of direct pictures or schlieren pictures of self-luminous phephenomena, direct pictures of opaque objects by reflective illumination, shadowgraphs, and schlieren photographs of nonluminous phenomena in gases.

This device can be designed with a mechanical speed limit as high as any camera which operates with continuous light on the optical compensator principle, or as high as any intermittent spark system known which takes all pictures on a single optical axis. This device has a very much higher optical speed than most other types of high-speed cameras known and higher than any type known which has similar freedom from distortion and similar adaptability to various photgraphic conditions. In general, this device attains an exceptionally satisfactory compromise between the, in many cases, mutually opposing desirable qualities of high optical speed, high mechanical speed, good definition, freedom from distortion, freedom from blurring due to motion of image with respect to film, adaptability to various types of photography, large number of pictures which can be exposed in one sequence, single optical axis for all pictures, simplicity of construction, possibility of projecting pictures as exposed without reprinting, and economy in the use of photographic film.

Due to the impossibility, from a practical standpoint, of moving a photographic film intermittently in a single direction, bringing it to a complete stop thousands of times each second, all known cameras or photographic arrangements taking pictures at speeds comparable with the speed of this device are compelled to use either a completely stationary film or a film moving at a substantially constant rate. It is therefore necessary to form a series of images displaced from each other in time and in position on the film, each such image moving with the film, or remaining stationary if the film is stationary, so that there shall be no relative motion between image and film, or each such image being of such extremely short duration that there is no appreciable motion of image with respect to the film during the time of exposure.

There are systems of photography based on the use of electrical spark discharges as a source of illumination which make use of each of the methods mentioned. In each case, however, these methods have the objection that they cannot be used for photographing self-luminous phenomena. They also have either the drawback that individual pictures must be exposed on different optical axes, allowing only a very few pictures to be taken in a single sequence or that the sparks cannot be sufficiently accurately spaced in time to permit projection of the resulting pictures as "moving pictures" without reprinting, arranging each picture individually in its proper place on the new film, a difficult and expensive process.

Many cameras have been invented, operating on the so-called optical compensator principle which utilizes a steady continuous light source and which can be used to photograph self-luminous phenomena. Cameras of this type form a series of images, displaced from each other in time and position on the film and having no motion relative to the film. This device is one of this type. In many cameras of this type it is necessary that the light forming the images be interrupted for an appreciable time between the formation of the separate images. This means that the exposure time of an individual picture must be substantially less than the reciprocal of the picture frequency. In many cases this is undesirable because the total light available is not sufficient to afford the loss due to the cut-off between pictures. With this device this difficulty is eliminated, it being possible to make instantaneous shift from one image to the next; that is, the exposure time of an individual picture may be equal to the reciprocal of the picture frequency or to any desired smaller interval of time. Another disadvantage of many cameras of this type is an imperfect match between speed of image movement and film speed, or in other cases, a slight variation of orientation of the image with respect to the film during the process of exposure. This device is exceptionally free from either of these disadvantages.

In order to form a series of images, stationary relative to the film and displaced from each other in time and position on the film, this device makes use of a multiplicity of light-beam-inverting mechanisms. These mechanisms are of such a nature that when placed in the path of an incident beam of light they will either transmit or reflect, as the case may be, a beam of light which is a continuation of the incident beam except that it is inverted with respect to a certain neutral plane. This neutral plane maintains a fixed position and orientation with reference to the light-beam-inverting mechanism. It is not desired to be limited to the types of light-beam-inverting mechanisms described herein, as it is recognized that any mechanism which receives an incident beam of light and transmits or reflects a continuation of that incident beam, such transmitted or reflected beam being inverted with respect to a plane which remains fixed with reference to the light-beam-inverting mechanism, may be used to accomplish the purpose utilized in this invention.

In this device a stationary objective lens is used to form an image, hereinafter referred to as the primary image, at or near a definite plane within one of the above-mentioned light-beam-inverting mechanisms. The light-beam-inverting mechanism is moved in a manner which is essentially translation in a direction perpendicular to the neutral plane of the beam inversion and also perpendicular to the optical axis of the objective lens. Due to the motion of the light-beam-inverting mechanism and because of its property of light-beam-inversion about a plane fixed with reference to itself, the light beam transmitted or reflected from the light-beam-inverting mechanism receives a translatory motion such as to give it the appearance of having come from a primary image moving in the same direction as and at twice the speed of the light-beam-inverting mechanism. This transmitted or reflected beam then passes through a lens or lens system so designed as to form a secondary image on a continuously moving film. The lens or lens system is so designed that the speed of the secondary image relative to the apparent speed of the primary image will be such that the secondary image will move at a speed equal to that of the film. By using a reduction ratio of approximately 1:2 between secondary and primary images, it is possible to have the photographic film carried alongside of the light-beam-inverting mechanisms on the same drum. The device is thereby reduced to a single moving part.

With the foregoing and other objects in view, the invention consists in the construction, combination and arrangement of parts hereinafter described and illustrated in the drawings, in which, Fig. 1 is a horizontal section through one form of this device;

Fig. 2 is a sectional view of some of the light-beam-inverting mechanisms and their support on line 2—2 of Fig. 1;

Fig. 3 is an elevation view of the exposure-time-controlling shield;

Fig. 4 is a sectional view of the fundamental type of light-beam-inverting mechanism of which prism 5 of Figs. 1 and 2 is an improved modification;

Fig. 5 is a detailed elevation of a modified form of reflecting means;

Fig. 7 is a sectional view through some of the light-beam-inverting mechanisms assembled on the rotating drum, being on line 7—7 of Fig. 6;

Fig. 8 is an end view of one of the light-beam-inverting mechanisms of the type used in the form of the invention shown in Fig. 1;

Fig. 9 is an end view of one of the light-beam-inverting mechanisms used in the form of the invention shown in Fig. 6;

Fig. 10 is an enlarged section of a portion of the rotating drum shown in Fig. 1, being on the line 10—10 of Fig. 1; and Figs. 11, 12 and 13 are schematic sketches of the paths followed by the light rays in the form of the invention shown in Fig. 1 for three different positions of the light-beam-inverting mechanisms and of the photo-sensitive film.

Figure 1:
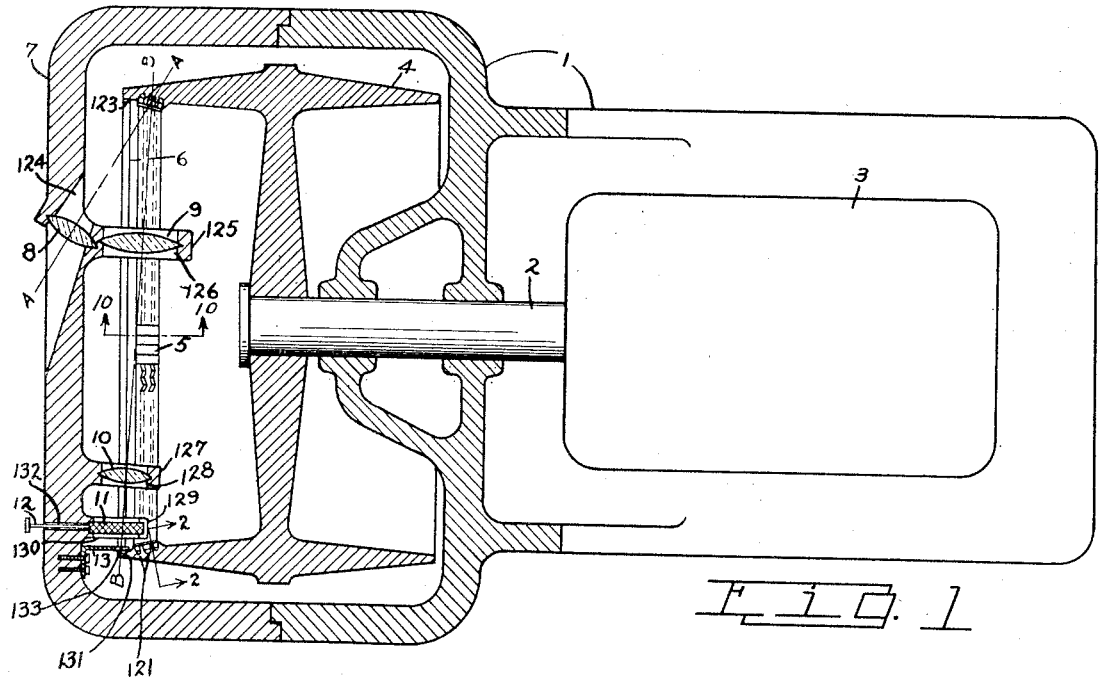

Referring particularly to Figs. 1, 2 and 3 of the drawings, the numeral 1 indicates the main frame and bed plate for this form of the device. The numeral 2 indicates a shaft, rotatably mounted in the frame 1 and driven by the direct-connected motor 3, or such other means as may be desired. On shaft 2 is rigidly mounted a drum 4. In a continuous circle around the inside of drum 4 is mounted a multiplicity of prisms 5, made of glass or other transparent material, which serve as the light-beam-inverting mechanisms mentioned above. A single one of these is shown in detail in Fig. 8. All sections perpendicular to the length of any one of these prisms 5 are identical right isosceles triangles modified by the addition of the two small prism surfaces 136 and 137, which surfaces are perpendicular to the large surface 161. These prisms are mounted in a single row entirely around the inside of drum 4. Each prism is mounted in the drum in such manner that its 90° face intersection will, at some time during a single turn of the drum, intersect axes A—A and B—B, Fig. 1, at the point at which these axes intersect each other. Axes A—A and B—B will be defined hereinafter. Each prism is arranged further so that at the time its 90° face intersection intersects the axes A—A and B—B this 90° face intersection will lie entirely within the plane of said axes A—A and B—B and will be perpendicular to the bisector of the angle existing between the said axes A—A and B—B. Each prism 5 is further so arranged in drum 4 that the bisector of the angle existing between the said axes A—A and B—B will be perpendicular to the large surface 161 of the prism at the time its 90° face intersection intersects the axes A—A and B—B. These prisms 5 may be mounted by means of the circumferential grooves 121 and the V-notches 122 in the manner and in the attitude made clear in Figs. 2 and 10. Although this method of mounting appears preferable to any other so far considered, this device is not limited to this method as a great many other possible methods are obvious.

Ledge 123 of drum 4 supports a photosensitive film 6 which extends around the entire inner circumference of that ledge. Cover 7 is rigidly attached to frame 1. In aperture 124 of cover 7 is mounted an objective lens 8 with optical axis A—A. This lens 8 is so placed as to form an image of the object to be photographed at the intersection of axes A—A and B—B. Axes A—A and B—B are so placed that the midpoints of the 90° face intersections of prisms 5 will pass successively through the intersection of these axes as the drum 4 is turned. Axes A—A and B—B are also so placed that the 90° face intersection of any prism 5 at the instant it intersects these axes will bisect the exterior angle formed by said axes. Axis B—B is also so placed that it will pass through the centerline of that portion of the film 6 on which images are to be formed. The numeral 9 indicates a lens mounted in aperture 126 in projection 125 of cover 7. The numeral 10 indicates a lens mounted in aperture 128 in projection 127 of cover 7. Lenses 9 and 10 are mounted with their optical axes coincident with axis B—B, the position of which is specified above. The focal lengths of lenses 9 and 10 and their positions along axis B—B are such that a secondary image of the object to be photographed will be formed on the film 6 at the point 131 and that the ratio of size of this secondary image to the size of the primary image formed at the intersection of the axes A—A and B—B will be $x_2/2x_1$ where $x_2$ is the distance of the point 131 from the axis of rotation of drum 4 and $x_1$ is the distance of the intersection of axes A—A and B—B from the axis of rotation of drum 4.

Numeral 11 indicates a mechanical shutter mounted in aperture 130 in projection 129 of cover 7. Shutter 11 is placed across the axis B—B and is operated by push rod 12 passing through bore 132 in cover 7, or by any other suitable means. Shutter 11 is so timed that it opens and closes within very nearly the same time as required for the drum 4 to complete a single revolution. Numeral 13, Figs. 1 and 3, indicates an exposure time controlling shield, rigidly secured to the inner side of cover 7 and placed as close as feasible to film 6 at the point 131. Shield 13 has a slot 133 of width $w$, the magnitude of $w$ governing the exposure time for any given picture at any given speed of rotation of drum 4. The shield 13 is so placed that the centerline of the slot 133 intersects the axis B—B. The over-all size of shield 13 is such that all light passing through lens 10 will be interrupted except that which passes through the slot 133 of the shield. The shield 13 is not essential to the operation of this device and when it is removed the maximum exposure time possible for any given speed of drum 4 prevails.

Referring further to Fig. 1, the light beam from the object to be photographed, which passes through lens 8, falls successively on the various prisms 5 at the intersection of axes A—A and B—B and is reflected by these prisms to form a secondary beam extending toward lenses 9 and 10 about the axis B—B. By virtue of the property possessed by each prism of inverting the reflected beam with respect to a neutral plane fixed with reference to the prism, the motion of prisms 5 due to rotation of the drum 4 causes the beam reflected from each successive prism to move in translation in the same manner as though the primary image formed at the intersection of axes A—A and B—B were moving in the same direction and at twice the speed of the prisms. The beams reflected from the various prisms 5 will also have the appearance of coming from different primary images displaced from one another by an amount equal to twice the distance between prisms 5. The corresponding secondary images produced by lenses 9 and 10 at point 131 will be spaced more closely together and will move more slowly than the apparent primary images in proportion to the reduction of their size relative to those apparent primary images. They will also be moving in the opposite direction to the apparent primary images. The result is that the secondary images formed at the point 131 move in the same direction and at the same speed as the film 6, and therefore satisfy the requirements for exposure of clear, unblurred pictures on the film.

The manner of operation of the form of the invention shown in Fig. 1 is made more clear by reference to Figs. 11, 12 and 13. For simplicity, in each of these figures the angle between axes A—A and B—B in Fig. 1 is assumed to be reduced to zero. Also for simplicity, the lens 8 is assumed to be at an extreme distance from the prisms 5 so that the light rays will be substantially parallel when reaching the prisms 5. In each figure, three of the prisms are shown and are designated 5', 5'', and 5'''. For simplicity, in each figure, lens 162 has replaced the two lenses 9 and 10 of Fig. 1. This substitution may be made if the lens 162 is placed twice as far from the prisms 5 as from the photosensitive film 6. In each of Figs. 11 to 13 there is a stationary object 163 which is assumed to be at an extreme distance from the lens 8. If the prisms 5', 5'', and 5''' were not interposed, the lens 8 would form an image of the object 163 in the position shown as 164 in each figure. It is postulated that the light rays traveling toward the prisms 5 do not pass through the film 6 or through the lens 162 in any of the three figures, but that the light rays proceeding from the prisms 5', 5'', and 5''' do pass through the lens 162 and are focussed by this lens to form secondary images on the photosensitive film 6. In each figure the image formed on photosensitive film 6 by light coming from prism 5' is designated 165, that formed by light from prism 5'' is designated 166, and that by light coming from prism 5''' is designated 167. In the transition from Fig. 11 through Fig. 12 to Fig. 13 the prisms 5', 5'', and 5''' are moved downward by equal increments and the photosensitive film 6, together with the images 165, 166, and 167, are moved upward by the same equal increments. In each of the figures, five rays are shown proceeding parallel each to each from the lens 8 to the prisms 5', 5'', or 5'''. These rays are designated $a$, $b$, $c$, $d$, and $e$. Ray $a$ proceeds from the arrow tip in the object, ray $b$ from the one-quarter position in the arrow, ray $c$ from the center of the arrow, ray $d$ from the three-quarter position in the arrow, and ray $e$ from the tail end of the arrow. At a number of points on each ray in the figures are arrow heads with literal designations corresponding to the rays to which they apply.

By means of these arrow heads each ray may be traced in each figure from its position in the object through lens 8, through prism 5', 5'', or 5''', and through lens 162 to the photosensitive film 6. In each figure any ray coming from a given position in the object 163 and passing through prism 5' will be seen to reach the same given position in image 165 on the photosensitive film 6. Likewise, a ray coming from any given position in the object 163 and passing through prism 5'' or 5''' will be seen to reach the same given position in image 166 or 167, respectively, on the photosensitive film 6. It will be seen that a prism in the position of 5'' in Fig. 11 is exposing the rear half of the arrow in the secondary image on the film 6, while a prism in the position of 5''' is exposing the forward half of the arrow. A prism in the position of 5''' in Fig. 12 is exposing the central half of the arrow on the film 6. It should be understood that the prisms 5 are of sufficient length in a direction perpendicular to the plane of Figs. 11, 12, or 13 to extend over the entire image 164.

In order to appreciate fully the advantage obtained in this device by forming a primary image at the 90° face intersections of prisms 5, it is necessary to consider these prisms in somewhat more detail. During the course of exposure of a single picture on the photosensitive film 6, utilizing a single prism 5, approximately half the light reaching a certain point in the primary image will be reflected from face 134 to face 135, see Fig. 2, and from face 135 through the prism and out towards lenses 9 and 10, Fig. 1. This portion of the light will hereinafter be referred to as following prism path No. 1. However, the other half of the light reaching the same point in the primary image will be reflected from face 135 to face 134 and from face 134 through the prism and out towards lenses 9 and 10. This portion of the light will hereinafter be referred to as following prism path No. 2. Now if the angle between faces 134 and 135, Fig. 2, is not exactly 90° (as it never is in practice) and if the primary image were not formed at the intersection of these faces but at some other point along either axis A—A or axis B—B, then light following prism path No. 1 and prism path No. 2 would not reach the same point on the film 6 even though coming from a single point within the primary image. This would result in a double exposure on the film. However, so long as the primary image is formed at the intersection of prism faces 134 and 135, Fig. 2, light which passes through a single point in the primary image reaches a single point on the film 6, regardless of appreciable errors in the 90° angle between faces 134 and 135. It is realized that it is possible for only one line within the primary image to come within a plane containing the line of intersection of prism faces 134 and 135, Fig. 2, due to the fact that the line of intersection of these faces is not perpendicular either to axis A—A or B—B. However, the entire image can easily be placed sufficiently near to a plane containing the line of intersection of faces 134 and 135 that the separation of images formed on film 6 by light following prism paths Nos. 1 and 2 is negligible.

Referring further to prism 5, Fig. 2, the small opaque nonreflecting faces 136 and 137 are provided to prevent any light passing through the prisms along the path P—Q shown in prism 67, Fig. 4. Light following such a path as P—Q would not reach the correct points on the film 6 and would have a deleterious effect on the pictures produced.

It is realized that the motion of prisms 5 across axes A—A and B—B is not purely translation. However, it can be shown that with certain practical magnitudes of the various dimensions and angles of various parts of the device as shown in Fig. 1, the motions of the secondary images relative to the film 6 due to the departure of prisms 5 from pure translatory motion is not serious.

It is not to be understood that lenses 8, 9 and 10 are limited to the simple forms as shown in Fig. 1, as it is obvious that a compound lens with any desired degree of optical corrections may be substituted in each case. It is also obvious that lenses 9 and 10 might be replaced by a single lens at some point on axis B—B, but it has been found that, with the largest apertures commercially available, two are necessary in order to utilize all light reaching prisms 5 from a large aperture lens 8.

It is not to be understood that the positions of lenses 8, 9, and 10 are limited to even approximately those shown in Fig. 1. It is realized that for any focal length and position along axis B—B arbitrarily assumed for lens 9 there are a corresponding focal length of lens 10 and a corresponding position of lens 10 along the axis B—B to produce a secondary image of the required size on the film 6, and that there are corresponding minimum apertures of lenses 9 and 10 necessary to utilize all the light coming from a lens 8 of a particular aperture. This invention includes the indefinite number of possible combinations of focal lengths of lenses 9 and 10 from which selection can be made of that combination allowing, in any particular case, the most easily obtained minimum apertures for these lenses.

It is realized that the surface of film 6 is not exactly perpendicular to axis B—B and that this can be almost entirely compensated simply by rotating lens 10 about an axis through its center perpendicular to axis B—B and to the plane of Fig. 1 as much as may be necessary to bring the secondary image into sharp focus on the film 6 throughout its entire area. This invention is, therefore, not limited to the orientation of lens 10, shown in Fig. 1.

It is to be noted that drum 4 carries prisms 5 and film 6 at the extreme end of a long overhanging ledge (in cross-section) in order to provide clearance for lenses 9 and 10, their mounts, and any adjusting mechanisms that might be provided. It is realized that greater mechanical speed at expense of some loss of optical speed could be made possible by shortening this ledge very much, placing lenses 9 and 10 on an axis or on axes other than B—B and bringing the light from prisms 5 through lenses 9 and 10 to film 6 by means of mirrors. It is also realized that in this case the prisms could be replaced by mirror surfaces forming 90° notches on the outside of the central portion of drum 4, such mirror surfaces being similar to mirror surfaces 90 and 91 of Fig. 5. This invention is, therefore, not limited to the arrangement shown in Fig. 1 in these respects.

It is apparent that film 6 does not need to be carried by drum 4 but could be carried through the plane of the secondary image in any other manner known to the art without conflicting with the spirit of this invention. However, the arrangement as shown in Fig. 1, appears superior for the taking of extremely high frequency pictures. It is also apparent that film 6, if carried through the plane of the secondary image in a manner other than shown in Fig. 1, could move at any desired speed and it would still be possible to choose lenses 9 and 10 of such focal lengths and in such positions as to cause the secondary images to move at the same speed as the film. This invention is, therefore, not limited to the arrangement shown in Fig. 1 of the drawings in these respects.

Figure 6:
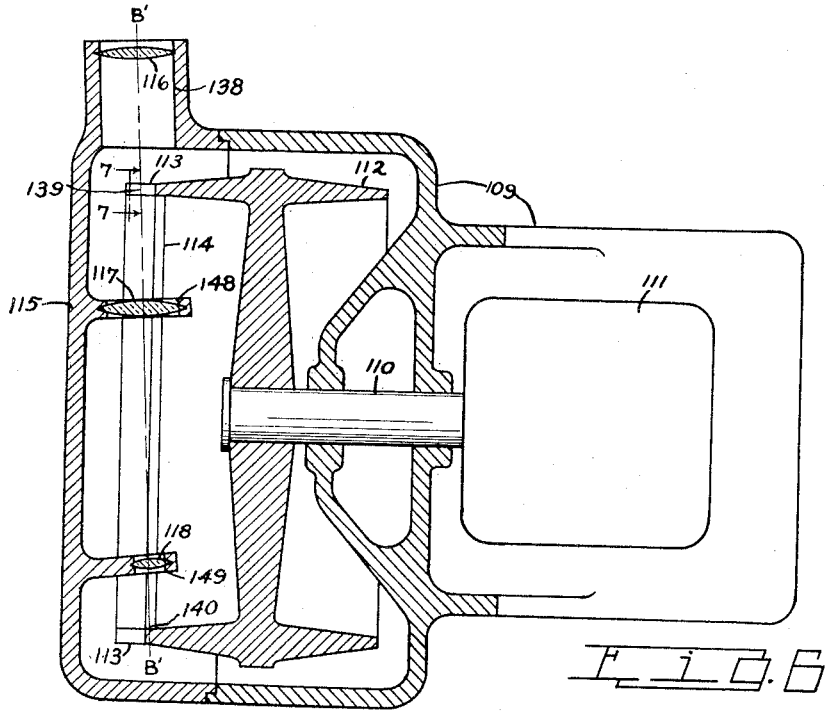
Fig. 6 is a horizontal section through a modified form of this invention.

Another form of this invention is shown in Figs. 6 and 7, and utilizes a different type of light-beam-inverting mechanism from that described above and involves such modifications of the other mechanisms as required for adaptation to the different type of light-beam-inverting mechanisms.

Referring particularly to Fig. 6 of the drawings, the numeral 109 indicates the main frame and bedplate in which is rotatably mounted shaft 110, driven by motor 111 or other suitable means. Rigidly mounted on shaft 110 is drum 112, Figs. 6 and 7, carrying a multiplicity of prisms 113, made of glass or other transparent substance, around its entire circumference. Faces 141, 142, and 143 of prisms 113, Figs. 7 and 9, are silvered for internal reflection. As to the other two surfaces of each prism, the shaded portions 144 and 145 are rendered opaque by black paint or other suitable means. The unshaded portions 146 and 147 are transparent optical surfaces. All light which performs any useful purpose in this form of the device passes through face 146, is reflected from face 141 to face 143, thence to face 142, thence to face 147 and through this face out of the prism, the beam of light being inverted in the process. The surfaces 144 and 145 are rendered opaque to prevent light passing directly through these two surfaces without touching any of the other prism surfaces. Consequently, the opaque surfaces 144 and 145 extend only so far as necessary to prevent light passing in a straight line through surfaces 146 and 147 without touching surfaces 141 and 142. All sections of any prism 113 perpendicular to the length of the prism are identical. The prisms 113 may be made with any desired proportions, except that it is desirable that the angle between faces 141 and 142 be such that a ray of light passing perpendicularly through the geometric center of the transparent portion of face 146 will be reflected from face 141 directly to the geometric center of face 143 and so that a ray of light passing perpendicularly through the geometric center of the transparent portion of face 147 will be reflected from face 142 directly to the geometric center of face 143. The angle between face 146 and face 141 should be equal to the angle between face 142 and face 147. Face 146 should be perpendicular to face 143 and face 143 should be perpendicular to face 147. Prisms 113 are placed in a single row entirely around the inside of drum 112 in such manner that the face 147 or the face 146 of any prism is perpendicular to a line passing through the geometric center of the transparent portion of face 147 and through the axis of rotation of drum 112 perpendicular to said axis of rotation. Further, each prism 113 is so placed in drum 112 that the intersection of faces 141 and 142 is parallel to the axis of rotation of the drum.

Also carried on drum 112 in the position shown is photosensitive film 114 extending around the entire inner circumference of the drum.

Cover 115 is rigidly secured to frame 109. Numeral 116 indicates an objective lens mounted in aperture 138 in cover 115. Lens 116 is placed with its optical axis coincident with axis B'—B' which passes, at point 139, through the longitudinal midpoint of prism 113 and, at point 140, through the centerline of that portion of film 114 which is to be exposed. Lens 116 is so placed that it forms a primary image of the object to be photographed at point 139 within prisms 113 as they cross the axis B'—B' due to rotation of drum 112. The light beam coming from lens 116 passes through prisms 113, continuing along axis B'—B', but by virtue of the light-beam-inverting property of prisms 113 the beam transmitted from these prisms moves in translation in a manner as if the primary images formed within prisms 113 were moving in the same direction as and twice as fast as the prisms 113. Numeral 117 indicates a lens rigidly secured in the aperture 148 of cover 115 and numeral 118 indicates a lens rigidly mounted in aperture 149 of cover 115. Lens 117 and lens 118 have their optical axes coincident with axis B'—B' described above. These lenses are of such focal lengths and are so positioned along axis B'—B' that they produce a secondary image focused on the film 114 at the point 140, the size of this secondary image at point 140 bearing the same relation to the size of the primary image at point 139 that the linear speed of film 114 at point 140 bears to the apparent linear speed of primary image at point 139. Due to the reduction in image size at point 140 as compared with point 139, the series of images formed at point 140 by the various prisms as they pass the point 139 will move at the same speed as the film 114 so that there will be no relative motion between these images and the film, which satisfies the requirement for exposure of unblurred pictures on the film. It is apparent that this form of the device is similar to the form illustrated in Fig. 1, except that a different type of light-beam-inverting mechanism is used and the position of the objective lens is shifted accordingly. This is not to be understood as limiting this form of this invention to the exact form shown in Fig. 6, as all the possible variations mentioned in discussion of the form shown in Fig. 1 apply with equal force to the form of Fig. 6.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. In a device for taking pictures, means for bringing light from the object to a focus to form a primary image, a multiplicity of optical devices of the type which transmit incident rays of light and impart to the transmitted rays a translational motion having a velocity equal to twice the translational velocity of the said optical devices themselves, means for bringing said optical devices in endless succession into the plane of aforesaid primary image and for moving said optical devices successively across the beam of light which forms the said image in a uniform manner so that the primary image shall have the appearance of moving at uniform speed in a single direction when viewed by the transmitted beam, means for supporting and moving a photosensitive film in a single direction at a speed having a predetermined relationship to the speed of the aforesaid optical devices, and optical means interconnecting aforesaid optical devices and said film-supporting and moving means for refocusing the transmitted beam to form a secondary image on aforesaid moving film and for causing said secondary image to bear the same ratio of size and speed to the aforesaid primary image as the ratio of film speed to speed of primary image, so that the said secondary image shall be stationary relative to the moving film.

2. In a device for taking pictures, means for bringing light from the object to a focus to form a primary image, a multiplicity of optical devices of the type which transmit incident rays of light and impart to the transmitted rays a translational motion having a velocity equal to twice the translational velocity of the said optical devices themselves, means for bringing said optical devices in endless succession into the plane of aforesaid primary image and for moving said optical devices successively across the beam of light which forms the said image in a uniform manner so that the primary image shall have the appearance of moving at uniform speed in a single direction when viewed by the transmitted beam, means for supporting and moving a photosensitive film in a single direction at a speed having a predetermined relationship to the speed of the aforesaid optical devices, and optical means interconnecting aforesaid optical devices and said film-supporting and moving means for refocussing the transmitted beam to form a secondary image on aforesaid moving film, for causing said secondary image to bear the same ratio of size and speed to the aforesaid primary image as the ratio of film speed to speed of primary image, and for changing direction of motion of secondary image relative to primary image, so that the said secondary image shall be stationary relative to the moving film.

3. In a device for taking pictures, means for bringing light from the object to a focus to form a primary image, a multiplicity of optical devices of the type which invert and transmit incident beams of light and by virtue of the inversion impart to the transmitted beams a translational motion having a velocity equal to twice the translational velocity of the said optical devices themselves, means for bringing said optical devices in endless succession into the plane of aforesaid primary image and for moving said optical devices successively across the beam of light which forms said image in a uniform manner so that the primary image shall have the appearance of moving at uniform speed in a single direction when viewed by the transmitted beam, means for supporting and moving a photosensitive film in a single direction at a speed having a predetermined relationship to the speed of aforesaid optical devices, and optical means interconnecting aforesaid optical devices and said film-supporting and moving means for refocussing the transmitted beam to form a secondary image on aforesaid moving film and for causing said secondary image to bear the same ratio of size and speed to aforesaid primary image as the ratio of film speed to speed of primary image, so that the said secondary image shall be stationary relative to the moving film.

4. In a device for taking pictures, means for bringing light from the object to a focus to form a primary image, a multiplicity of optical devices of the type which reflect incident rays of light and impart to the reflected rays translational motion having a velocity equal to twice the translational velocity of the said optical devices themselves, each such optical device comprising essentially two reflecting surfaces making an angle of ninety degrees with each other, means for bringing said optical devices in endless succession into the plane of the aforesaid primary image and for moving said optical devices successively across the beam of light which forms said image in a uniform manner so that the primary image shall have the appearance of moving at a uniform speed in a single direction when viewed by the reflected beam, means for supporting and moving a photosensitive film in a single direction at a speed having a predetermined relationship to the speed of aforesaid optical devices, and optical means interconnecting aforesaid optical devices and film-supporting and moving means for refocussing the reflected beam to form a secondary image on aforesaid moving film and for causing said secondary image to bear the same ratio of size and speed to aforesaid primary image as the ratio of film speed to speed of primary image, so that the said secondary image shall be stationary relative to the moving film.

5. In a device for taking pictures, means for bringing light from the object to a focus to form a primary image, a multiplicity of optical devices of the type which reflect incident rays of light and impart to the reflected rays translational motion having a velocity equal to twice the translational velocity of the said optical devices themselves, each such optical device comprising essentially a transparent prism of right-isosceles-triangular cross-section, means for bringing said optical devices in endless succession into the plane of the aforesaid primary image and for moving said optical devices successively across the beam of light which forms said image in a uniform manner so that the primary image shall have the appearance of moving at a uniform speed in a single direction when viewed by the reflected beam, means for supporting and moving photosensitive film in a single direction at a speed having a predetermined relationship to the speed of aforesaid optical devices, and optical means interconnecting aforesaid optical devices and said film-supporting and moving means for refocussing the reflected beam to form a secondary image on aforesaid moving film and for causing said secondary image to bear the same ratio of size and speed to aforesaid primary image as the ratio of film speed to speed of primary image, so that the said secondary image shall be stationary relative to the moving film.

6. In a device for taking pictures, means for bringing light from the object to a focus to form a primary image, a multiplicity of optical devices of the type which reflect incident rays of light and impart to the reflected rays a translational motion having a velocity equal to twice the translational velocity of the said optical devices themselves, each such optical device comprising a prism of right-isosceles-triangular cross-section modified by the existence of two small faces each parallel to a plane bisecting the prism's ninety degree face angle, means for bringing said optical devices in endless succession into the plane of the aforesaid primary image and for moving said optical devices successively across the beam of light which forms said image in a uniform manner so that the primary image shall have the appearance of moving at a uniform speed in a single direction when viewed by the reflected beam, means for supporting and moving photosensitive film in a single direction at a speed having a predetermined relationship to the speed of aforesaid optical devices, and optical means interconnecting aforesaid optical devices and said film-supporting and moving means for refocussing the reflected beam to form a secondary image on aforesaid moving film and for causing said secondary image to bear the same ratio of size and speed to aforesaid primary image as the ratio of film speed to speed of primary image, so that the said secondary image shall be stationary relative to the moving film.

7. In a device for taking pictures, means for bringing light from the object to a focus to form a primary image, a multiplicity of optical devices of the type which transmit incident rays of light and impart to the transmitted rays translational motion having a velocity equal to twice the translational velocity of the said optical devices themselves, each of such optical devices comprising essentially three reflecting surfaces held rigidly in a constant relationship to each other, means for bringing said optical devices in endless succession into the plane of aforesaid primary image and for moving said optical devices successively across the beam of light which forms said image in a uniform manner so that the primary image shall have the appearance of moving at uniform speed in a single direction when viewed by the transmitted beam, means for supporting and moving a photo-sensitive film in a single direction at a speed having a predetermined relationship to the speed of aforesaid optical devices, and optical means interconnecting aforesaid optical devices and said film-supporting and moving means for refocussing the transmitted beam to form a secondary image on aforesaid moving film and for causing said secondary image to bear the same ratio of size and speed to aforesaid primary image as the ratio of film speed to speed of primary image, so that the said secondary image shall be stationary relative to the moving film.

8. In a device for taking pictures, means for bringing light from the object to a focus to form a primary image, a multiplicity of optical devices of the type which transmit incident rays of light and impart to the transmitted rays a translational motion having a velocity equal to twice the translational velocity of the said optical devices themselves, each of such optical devices comprising a transparent prism having three reflecting surfaces and two transmitting surfaces, means for bringing said optical devices in endless succession into the plane of aforesaid primary image and for moving said optical devices successively across the beam of light which forms said image in a uniform manner so that the primary image shall have the appearance of moving at uniform speed in a single direction when viewed by the transmitted beam, means for supporting and moving a photosensitive film in a single direction at a speed having a predetermined relationship to the speed of aforesaid optical devices, and optical means interconnecting aforesaid optical devices and said film-supporting and moving means for refocussing the transmitted beam to form a secondary image on aforesaid moving film and for causing said secondary image to bear the same ratio of size and speed to aforesaid primary image as the ratio of film speed to speed of primary image, so that the said secondary image shall be stationary relative to the moving film.

9. In a device for taking pictures, means for bringing light from the object to a focus to form a primary image, a multiplicity of optical devices of the type which reflect incident rays of light and impart to the reflected rays translational motion having a velocity equal to twice the translational velocity of the said optical devices themselves, each of such optical devices comprising essentially two reflecting surfaces making an angle of approximately ninety degrees with each other, means for bringing said optical devices in endless succession into the plane of aforesaid primary image and for moving said optical devices successively across the beam of light which forms said image in a uniform manner so that there shall appear to be a single primary image moving at uniform speed in a single direction when viewed by the reflected beam, singularity of said primary image as viewed by the reflected beam being attained in spite of inaccuracies of the ninety-degree surface intersection because of the close proximity of said ninety-degree intersection to the said primary image, means for supporting and moving photosensitive film in a single direction at a speed having a predetermined relationship to the speed of aforesaid optical devices, and optical means interconnecting aforesaid optical devices and said film-supporting and moving means for refocussing the reflected beam to form a secondary image on aforesaid moving film and for causing said secondary image to bear the same ratio of size and speed to aforesaid primary image as the ratio of film speed to speed of primary image, so that the said secondary image shall be stationary relative to the moving film.

10. In a device for taking pictures, means for bringing light from the object to a focus to form a primary image, a multiplicity of optical devices of the type which reflect incident rays of light and impart to the reflected rays translational velocity of the said optical devices themselves, each such optical device comprising essentially two reflecting surfaces making an angle of ninety degrees with each other, means for bringing said optical devices in endless succession into the plane of the aforesaid primary image and for moving said optical devices successively across the beam of light which forms said image in a uniform manner so that the primary image shall have the appearance of moving at a uniform speed in a single direction when viewed by the reflected beam, the axis of said reflected beam at the midpoint of its travel intersecting and making an appreciable angle with the aforesaid incident beam, means for supporting and moving a photo-sensitive film in a single direction at a speed having a predetermined relationship to the speed of aforesaid optical devices, and optical means interconnecting aforesaid optical devices and film-supporting and moving means for refocussing the reflected beam to form a secondary image on aforesaid moving film and for causing said secondary image to bear the same ratio of size and speed to aforesaid primary image as the ratio of film speed to speed of primary image, so that the said secondary image shall be stationary relative to the moving film.

11. In a device for taking pictures, means for bringing light from the object to a focus to form a primary image, a multiplicity of optical devices of the type which transmit incident rays of light and impart to the transmitted rays a translational motion having a velocity equal to twice the translational velocity of the said optical devices themselves, means for bringing said optical devices in endless succession into the plane of aforesaid primary image and for moving said optical devices successively across the beam of light which forms the said image in a uniform manner so that the primary image shall have the appearance of moving at uniform speed in a single direction when viewed by the transmitted beam, means for supporting and moving a photosensitive film in a single direction at a speed having a predetermined relationship to the speed of the aforesaid optical devices, optical means interconnecting aforesaid optical devices and said film-supporting and moving means for refocussing the transmitted beam to form a secondary image on aforesaid moving film and for causing said secondary image to bear the same ratio of size and speed to the aforesaid primary image as the ratio of film speed to speed of primary image, so that the said secondary image shall be stationary relative to the moving film, and a slotted shield in close proximity to the aforesaid photosensitive film to control exposure time of each portion of the aforesaid secondary image on said photosensitive film.

12. In a device for taking pictures, means for bringing light from the object to a focus to form a primary image, a multiplicity of optical devices of the type which reflect incident rays of light and impart to the reflected rays a translational motion having a velocity equal to twice the translational velocity of the said optical devices themselves, means for bringing said optical devices in endless succession into the plane of aforesaid primary image and for moving said optical devices successively across the beam of light which forms the said image in a uniform manner so that the primary image shall have the appearance of moving at uniform speed in a single direction when viewed by the reflective beam, means for supporting and moving a photosensitive film in a single direction at a speed having a predetermined relationship to the speed of the aforesaid optical devices, and optical means interconnecting aforesaid optical devices and said film-supporting and moving means for refocussing the reflected beam to form a secondary image on aforesaid moving film and for causing said secondary image to bear the same ratio of size and speed to the aforesaid primary image as the ratio of film speed to speed of primary image, so that the said secondary image shall be stationary relative to the moving film.

13. In a device for taking pictures, means for bringing light from the object to a focus to form a primary image, a multiplicity of optical devices of the type which reflect incident rays of light and impart to the reflected rays a translational motion having a velocity equal to twice the translational velocity of the said optical devices themselves, means for bringing said optical devices in endless succession into the plane of aforesaid primary image and for moving said optical devices successively across the beam of light which forms the said image in a uniform manner so that the primary image shall have the appearance of moving at uniform speed in a single direction when viewed by the reflected beam, means for supporting and moving a photosensitive film in a single direction at a speed having a predetermined relationship to the speed of the aforesaid optical devices, and optical means interconnecting aforesaid optical devices and said film-supporting and moving means for refocussing the reflected beam to form a secondary image on aforesaid moving film, for causing said secondary image to bear the same ratio of size and speed to the aforesaid primary image as the ratio of film speed to speed of primary image, and for changing direction of motion of secondary image relative to primary image, so that the said secondary image shall be stationary relative to the moving film.

14. In a device for taking pictures, means for bringing light from the object to a focus to form a primary image, a multiplicity of optical devices of the type which invert and reflect incident beams of light and by virtue of the inversion impart to the reflected beams a translational motion having a velocity equal to twice the translational velocity of the said optical devices themselves, means for bringing said optical devices in endless succession into the plane of aforesaid primary image and for moving said optical devices successively across the beam of light which forms said image in a uniform manner so that the primary image shall have the appearance of moving at uniform speed in a single direction when viewed by the reflected beam, means for supporting and moving a photosensitive film in a single direction at a speed having a predetermined relationship to the speed of aforesaid optical devices, and optical means interconnecting aforesaid optical devices and said film-supporting and moving means for refocussing the reflected beam to form a secondary image to bear the same ratio of size and speed to aforesaid primary image as the ratio of film speed to speed of primary image, so that the said secondary image shall be stationary relative to the moving film.

CEARCY D. MILLER.